United States Patent
Seol

(10) Patent No.: US 11,752,990 B2
(45) Date of Patent: Sep. 12, 2023

(54) APPARATUS FOR CONTROLLING ANTI LOCK BRAKE SYSTEM OF ESC INTEGRATED BRAKE SYSTEM AND METHOD THEREOF

(71) Applicant: HYUNDAI MOBIS CO., LTD., Seoul (KR)

(72) Inventor: Yong Cheol Seol, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 1096 days.

(21) Appl. No.: 16/460,093

(22) Filed: Jul. 2, 2019

(65) Prior Publication Data
US 2020/0001842 A1    Jan. 2, 2020

(30) Foreign Application Priority Data

Jul. 2, 2018   (KR) .......................... 10-2018-0076304

(51) Int. Cl.
*B60T 8/176*   (2006.01)
*B60T 8/48*    (2006.01)

(52) U.S. Cl.
CPC ............ *B60T 8/176* (2013.01); *B60T 8/4827* (2013.01); *B60T 2260/09* (2013.01); *B60T 2270/10* (2013.01); *B60T 2270/30* (2013.01)

(58) Field of Classification Search
CPC .... B60T 8/176; B60T 8/4827; B60T 2270/10; B60T 2260/09; B60T 2270/30
See application file for complete search history.

(56) References Cited

U.S. PATENT DOCUMENTS

2016/0304072 A1* 10/2016 Knechtges ............ B60T 8/4086
2018/0015912 A1   1/2018 Foitzik et al.

FOREIGN PATENT DOCUMENTS

| DE | 102009033499 A1 * | 1/2010 | ............ B60T 13/686 |
| KR | 10-2007-0104982 A | 10/2007 | |
| KR | 10-2016-0090675 A | 8/2016 | |
| WO | WO-2016184616 A1 * | 11/2016 | ............ B60T 13/686 |

OTHER PUBLICATIONS

KR 20160090675 A—Machine Translation (Year: 2016).*

\* cited by examiner

*Primary Examiner* — Melanie Torres Williams
(74) *Attorney, Agent, or Firm* — Morgan, Lewis & Bockius LLP

(57) ABSTRACT

An apparatus for controlling an ABS of an ESC integrated brake system and a method thereof. The apparatus includes a main master cylinder generating hydraulic brake pressure through a piston that is moved forward/backward by an actuator that is operated when a brake pedal of a vehicle is pressed down; and a controller controlling forward/backward movement direction change of the piston by controlling a driving current that is applied to the actuator by determining whether a direction change condition according the control state of wheel pressure is satisfied, when a brake mode of the vehicle is an ABS mode and the piston has reached a predetermined direction change position for forward/backward movement direction change.

8 Claims, 4 Drawing Sheets

APPARATUS FOR CONTROLLING ANTI LOCK BRAKE SYSTEM OF ESC INTEGRATED BRAKE SYSTEM AND METHOD THEREOF

CROSS-REFERENCES TO RELATED APPLICATIONS

The present application claims priority under 35 U.S.C. § 119(a) to Korean Patent Application No. 10-2018-0076304 filed on Jul. 2, 2018 in the Korean Intellectual Property Office, which is incorporated herein by reference in its entirety.

BACKGROUND

1. Technical Field

Embodiments of the present disclosure relate to an apparatus for controlling an Anti-lock Brake System (ABS) of an ESC integrated brake system and a method thereof, and more particularly, to an apparatus for controlling an ABS of an ESC integrated brake system, the apparatus being able to improve an ABS control characteristic in an ESC integrated brake system, and a method thereof.

2. Related Art

Recently, an ESC integrated brake system including Electronic Stability Control (ESC) that can provide active braking in a Conventional Brake System (CBS) has been proposed. Such an ESC integrated brake system secures stability of a vehicle by performing the functions of an Anti-lock Brake System (ABS), Vehicle Dynamics Control (VDC), and a Traction Control System (TCS) when the stability in straight driving, turning, and uphill driving of the vehicle decreases while the vehicle is driven.

The ESC integrated brake system generally includes: an actuator composed of a backup master cylinder, a pedal simulator implementing pedal feel for a driver, a main master cylinder implementing brake pressure for wheels, a motor controlling hydraulic pressure of the main master cylinder, and a linear motion conversion mechanism (e.g., a ball screw and a screw guide) converting a rotational motion of the motor in to a linear motion; and a plurality of valves controlling hydraulic pressure in channels.

Meanwhile, wheel pressure is increased or decreased in accordance with wheel speeds in an ABS mode to improve stability in straight driving in the ESC integrated brake system. Unlike existing CBS brake systems, brake oil is discharged to a reservoir in decompression in the ESC integrated brake system, so it is required to supplement the brake oil that is consumed for ABS control by reciprocating forward and backward the piston, which is connected to the motor, of the main master cylinder within predetermined displacement in order to continuously increase and decrease pressure. Wheel pressure is increased by opening an inlet valve of a wheel to be increased in pressure and supplying hydraulic brake pressure of the main master cylinder, which is generated through this process, to a corresponding wheel cylinder, the wheel pressure of a wheel that requires to be decreased in pressure is decreased by closing a corresponding inlet valve and opening a corresponding outlet valve, and the wheel pressure of a wheel that is required to maintain the wheel pressure is maintained by closing a corresponding inlet valve and outlet valve.

The background technology of the disclosure has been disclosed in Korean Patent Application Publication No. 2007-0104982 (Published on Oct. 30, 2007).

SUMMARY

As described above, the piston of a main master cylinder continuously supplied brake oil, which is consumed in wheel pressure control, by continuously moving forward/backward in ABS control in an ESC integrated brake system.

However, when the piston change the movement direction from forward movement to backward movement or from backward movement to forward movement, the pressure of a chamber to be pressurized is 0 bar and there is the inertia of the piston, so predetermined time is taken until the movement direction of the piston is changed and the pressure of the main master cylinder increases to previous pressure.

When an inlet valve is opened in a pressure-increasing control state required to increase wheel pressure, the wheel pressure is decreased in the state required to increase pressure, so it is required to prevent reduction of wheel pressure by closing the inlet valve until the pressure of the main master cylinder increases larger than the previous pressure. Accordingly, when the piston changes the forward/backward movement direction in the state required to increase wheel pressure, holding is required by closing the inlet valve, so brake deceleration decreases and ABS control efficiency is reduced.

Further, it is required to apply large torque for reverse of a motor in order to quickly change the movement direction of the piston, but in this case, noise is generated due to the operation of the piston and the motor and hydraulic circuit pressure considerably increases, which exerts an adverse influence on the durability of an actuator.

Various embodiments are directed to an apparatus for controlling an ABS of an ESC integrated control system and a method thereof for maintaining brake deceleration when a piston changes a forward/backward movement direction, reducing noise due to direction change of the piston, and improving the durability of an actuator in ABS control in which the piston has to continuously supply brake oil, which is consumed in wheel pressure control, by continuously moving forward/backward in the ESC integrated brake system.

In an embodiment, an apparatus for controlling an ABS of an ESC integrated brake system may include: a main master cylinder generating hydraulic brake pressure through a piston that is moved forward/backward by an actuator that is operated when a brake pedal of a vehicle is pressed down; and a controller controlling forward/backward movement direction change of the piston by controlling a driving current that is applied to the actuator by determining whether a direction change condition according the control state of wheel pressure is satisfied, when a brake mode of the vehicle is an ABS mode and the piston has reached a predetermined direction change position for forward/backward movement direction change.

The direction change condition according to the control state of wheel pressure may be a condition in which wheel pressure for front wheels and rear wheels is maintained or in a pressure-decreasing control state, or wheel pressure for the front wheels is maintained or in a pressure-decreasing control state and wheel pressure for the rear wheels is in a pressure-increasing control state.

The controller may determine whether the direction change condition is satisfied by checking open/close states of inlet valves that connect/disconnect hydraulic brake pressure that is supplied to each wheel cylinder of the vehicle.

The direction change position may include an upper limit direction change position set as a position under a threshold upper limit position of the piston, and a lower limit direction change position set as a position over a threshold lower limit position of the piston.

The controller may perform forward/backward movement direction change of the piston by controlling a driving current, which linearly increases/decreases within a range having a value lower than a reference driving current, to be applied to the actuator, in which the reference driving current may be a current that is applied to the actuator to generate torque required for forward/backward movement direction change of the piston at the threshold upper limit position or the threshold lower limit position.

In an embodiment, a method of controlling an ABS of an ESC integrated brake system may include: a step in which a controller determines whether a brake mode of a vehicle is an ABS mode; a step in which when the brake mode of a vehicle is the ABS mode, the controller determines whether a piston of a main master cylinder has reached a predetermined direction change position for forward/backward movement direction change, in which the main master cylinder generates hydraulic brake pressure through the piston that is moved forward/backward by an actuator that is operated when a brake pedal of the vehicle is pressed down; a step in which when the piston has reached the direction change position, the controller determines whether a direction change condition according to the control state of wheel pressure is satisfied; and a step in which when the direction change condition is satisfied, the controller performs forward/backward movement direction change of the piston by controlling a driving current that is applied to the actuator.

According to the embodiments, in ABS control of an ESC integrated brake system, it is possible to maintain brake deceleration by reducing a loss of braking force by performing forward/backward movement direction change of a piston of a main master cylinder in consideration of the control state of wheel pressure and it is possible to reduce noise due to direction change of the piston and improve the durability of an actuator by controlling the actuator through a driving current that linearly increases within a predetermined range.

DESCRIPTION OF SPECIFIC EMBODIMENTS

Figure 1:
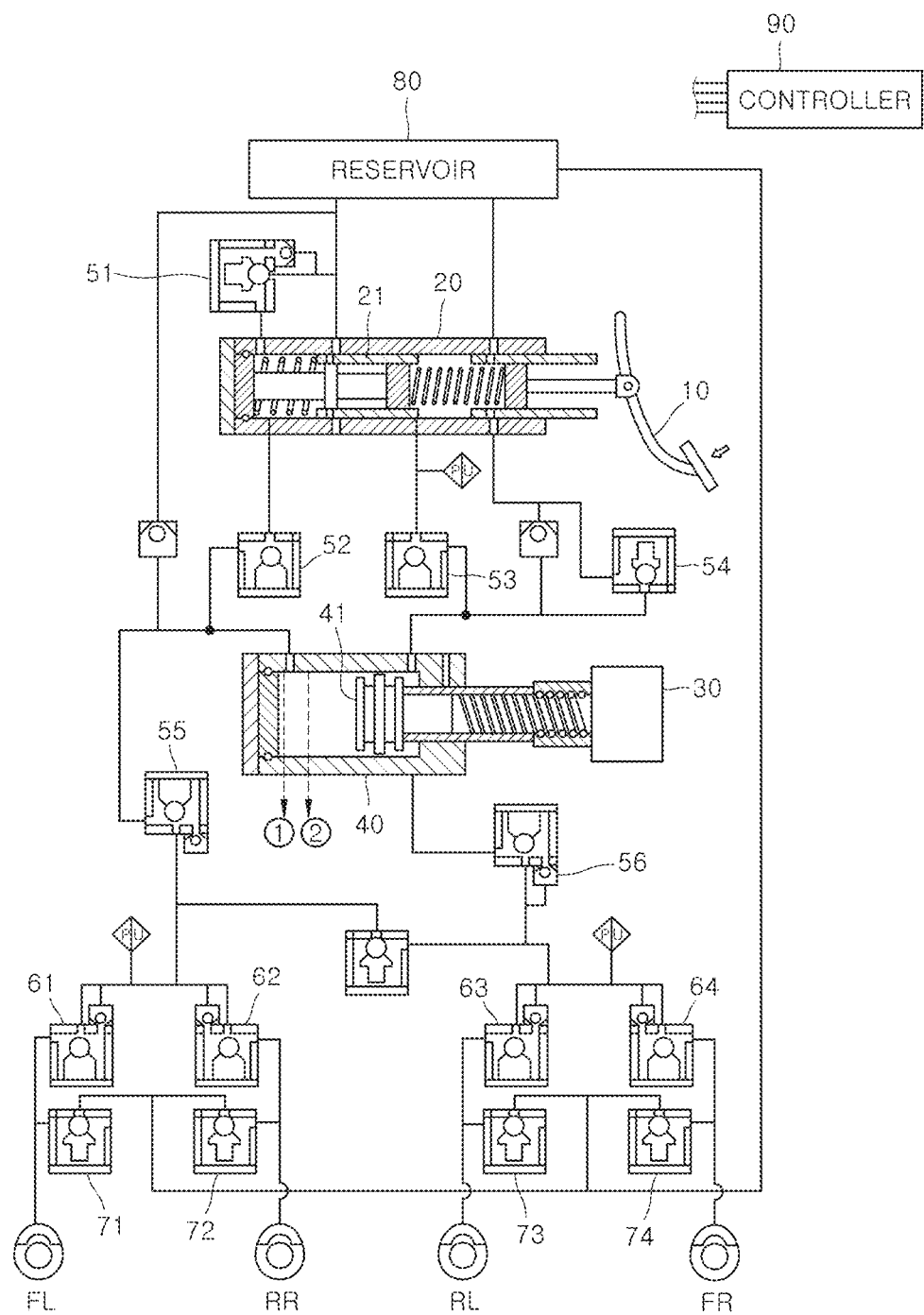
FIG. 1 is a hydraulic circuit diagram for illustrating an apparatus for controlling an ABS of an ESC integrated brake system according to an embodiment of the disclosure.

Hereafter, an apparatus for controlling an ABS of an ESC integrated brake system and a method thereof according to embodiments of the disclosure will be described in detail with reference to the accompanying drawings. The thicknesses of lines or sizes of components illustrated in the drawings may be exaggerated for the clarity and convenience of the following description. Further, the terminologies described below are terminologies determined in consideration of the functions in the disclosure and may be construed in different ways by the intention of users and operators or custom. Therefore, the definitions of the terminologies should be construed on the basis of the contents throughout the specification.

Figure 2:
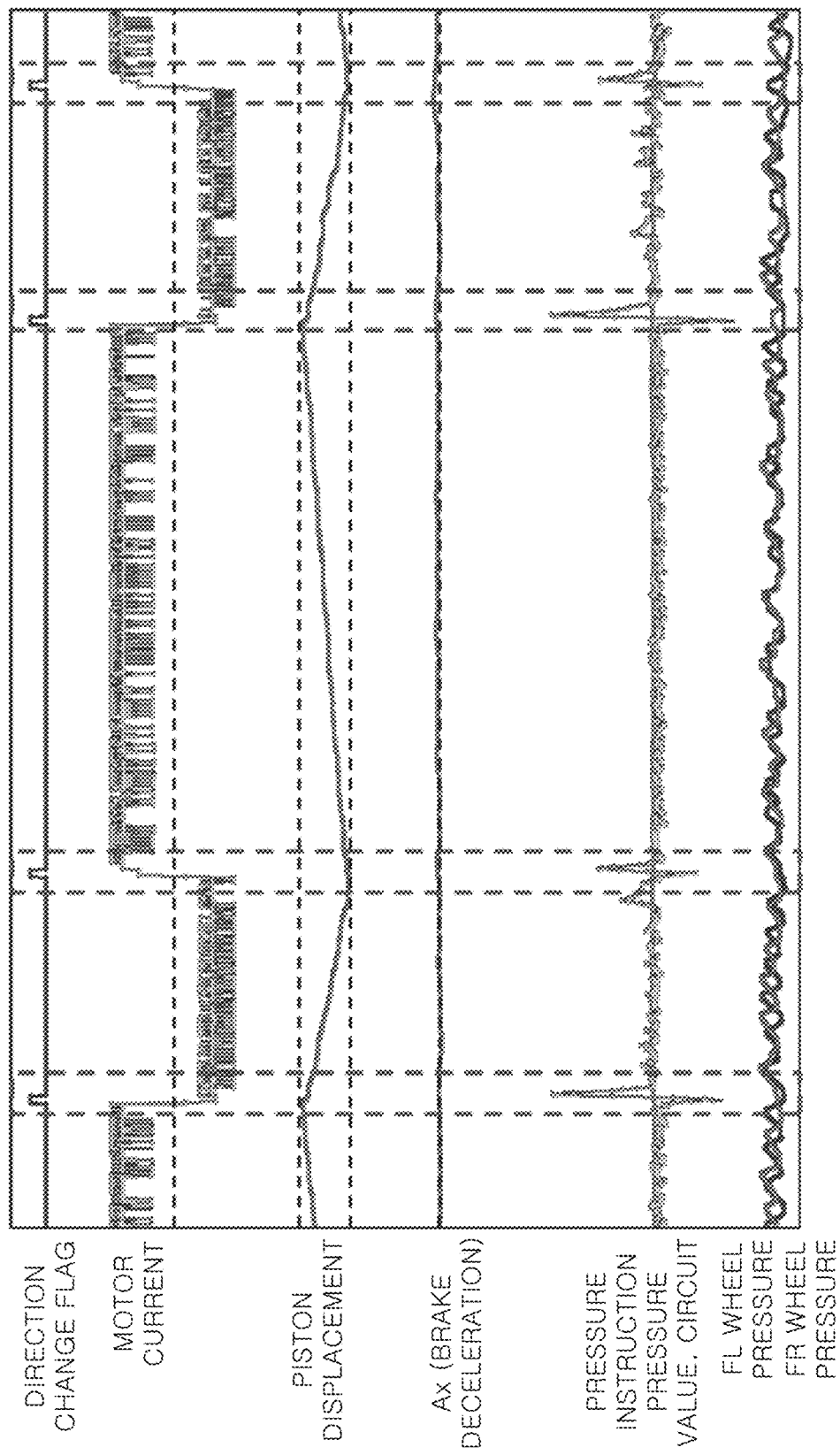
FIGS. 2 and 3 are exemplary diagrams for illustrating the effect of an apparatus for controlling an ABS of an ESC integrated brake system according to an embodiment of the disclosure.
Figure 3:
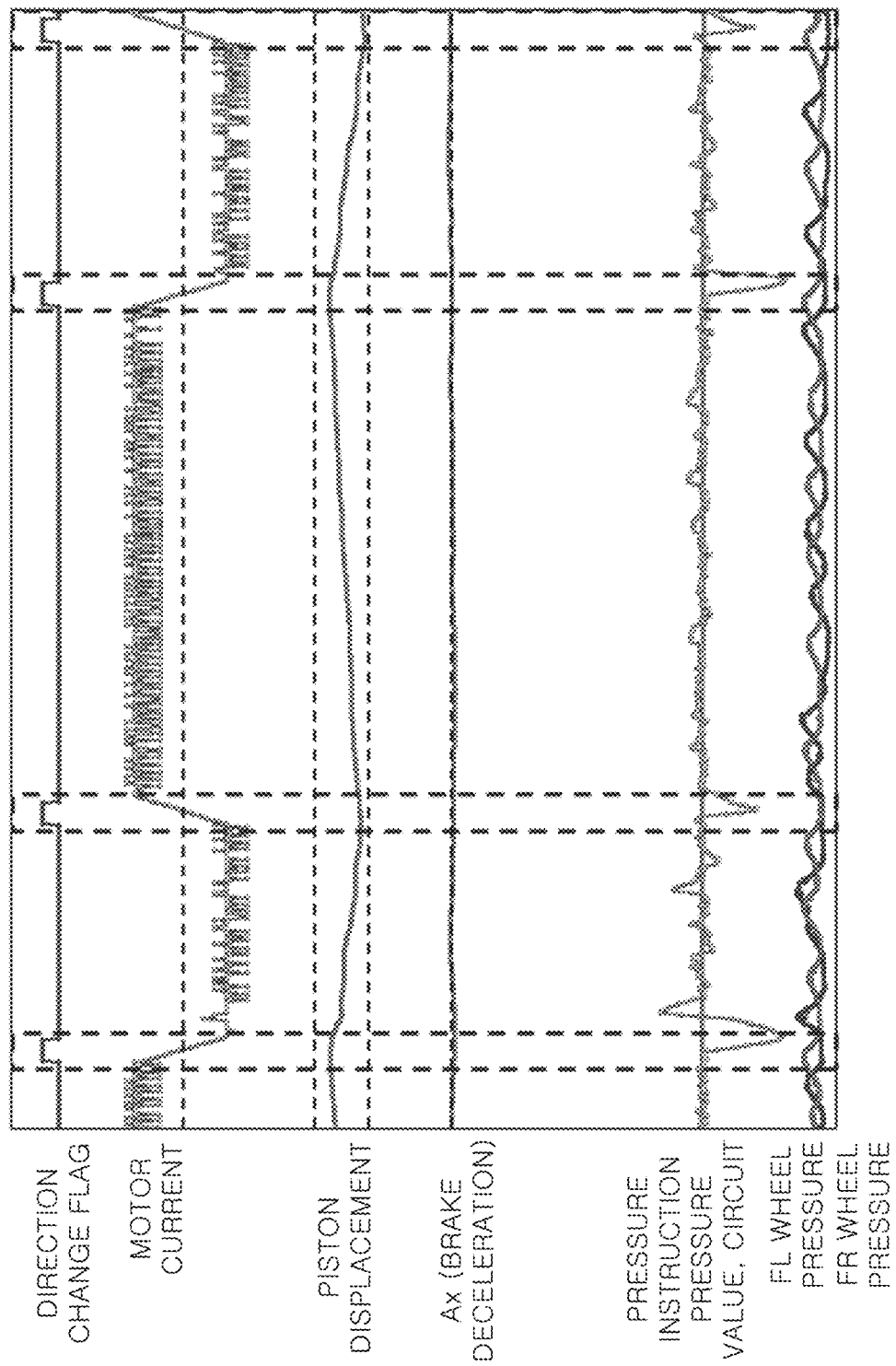

FIG. 1 is a hydraulic circuit diagram for illustrating an apparatus for controlling an ABS of an ESC integrated brake system according to an embodiment of the disclosure and FIGS. 2 and 3 are exemplary diagrams for illustrating the effect of an apparatus for controlling an ABS of an ESC integrated brake system according to an embodiment of the disclosure.

With reference to FIG. 1, the structure of an ESC integrated brake system according to an embodiment of the disclosure is generally described. When a depressing force is applied to a brake pedal 10 from a driver, hydraulic pressure is generated by a backup master cylinder 20, the generated hydraulic pressure is supplied to a piston of a pedal simulator 21, an elastic member of the pedal simulator 21 is pressed, and pedal feel for the driver is implemented by a reaction force of the pressed elastic member. As the vehicle is in a braking status(that is, as the brake pedal 10 is depressed), an actuator 30 (motor) is controlled to operate by a controller 90 in order to generate hydraulic brake pressure on the basis of signals output from a pedal stroke sensor (not shown) and a backup master cylinder pressure sensor, and a main master cylinder 40 generates hydraulic brake pressure through a piston 41 that is moved forward/backward by the actuator 30. A plurality of hydraulic control valves 51~57 for achieving an effect of reducing the diameter of a cylinder and adjusting hydraulic pressure is provided, inlet valves 61~64 for supplying and blocking brake oil that is supplied to each wheel cylinder are provided, and outlet valves 71~74 for supplying and blocking brake oil that is discharged from each wheel cylinder are disposed channels between each wheel cylinder and a reservoir 80.

Hereafter, an apparatus for controlling an ABS of an ESC integrated brake system according to an embodiment of the disclosure is described in detail mainly in terms of the operation of the controller 90 on the basis of the structure of an ESC integrated brake system described above.

When a brake mode of a vehicle is an Anti-lock Brake System (ABS) mode and the piston 41 reaches a predetermined direction change position for forward/backward movement direction change, the controller 90 can control the forward/backward movement direction change of the piston 41 by controlling a driving current that is applied to the actuator 30 by determining whether a direction change condition according to a control state of wheel pressure is satisfied.

In detail, the technical solution of the present embodiment is to improve a control characteristic when controlling an ABS in which brake oil should be continuously supplied to supplement brake oil that is consumed in wheel pressure control through forward/backward movement of the piston 41 in the ESC integrated brake system, and to this end, the controller 90 determines first whether the current brake mode of a vehicle is an ABS mode.

When determining that the brake mode of a vehicle is the ABS mode, the controller 90 determines whether the piston 41 of the main master cylinder 40 has reached the predetermined direction change position for forward/backward movement direction change. The direction change position may include an upper limit direction change position set as a position under a threshold upper limit position of the piston 41, and a lower limit direction change position sets as a position over a threshold lower limit position of the piston 41.

The threshold upper limit position means a threshold position for changing forward movement into backward movement without a collision between the piston 41 and the chamber of the main master cylinder 40. Similarly, the threshold lower limit position means a threshold position for changing backward movement into forward movement without a collision between the piston 41 and the chamber of the main master cylinder 40.

Accordingly, when the piston 41 changes movement direction at the threshold upper limit position or the threshold lower limit position, the controller 90 can control the piston 41 to change the movement direction at the upper limit direction change position set as a position under the threshold upper limit position or at the lower limit direction change position set as a position over the threshold lower limit position in order to reduce the burden that it has to apply a large driving current to the actuator 30 for quick direction change of the piston 41. In FIG. 1, ① shows an example of the threshold upper limit position and ② shows an example of the upper limit direction change position.

When determining that the piston 41 has reached the upper limit direction change position or the lower limit direction change position, the controller 90 determines whether the direction change condition according to the control state of wheel pressure is satisfied.

That is, as described above, when forward/backward movement direction change of the piston 41 is performed in a pressure-increasing control state in which it is required to increase wheel pressure, holding is required by closing the inlet valves 61~64, so there is a problem in that braking deceleration decreases and the ABS control efficiency is deteriorated. Accordingly, the controller 90 can control the forward/backward movement direction change of the piston 41 in consideration of whether the direction change condition according to the control state of wheel pressure is satisfied.

The direction change condition according to the control state of wheel pressure means a condition in which wheel pressure for front wheels and rear wheels is maintained or in a pressure-decreasing control state, or wheel pressure for the front wheels is maintained or in a pressure-decreasing control state and wheel pressure for the rear wheels is in a pressure-increasing control state.

That is, in order to maximally avoid the case in which forward/backward movement direction change of the piston 41 is performed in a pressure-increasing control state that is required to increase wheel pressure, the controller 90 can perform forward/backward movement direction change of the piston 41 when the wheel pressure for front wheels and rear wheels is maintained or in the pressure-decreasing control state (first condition) or the wheel pressure for the front wheels is maintained or in the pressure-decreasing control state and the wheel pressure for the rear wheels is in the pressure-increasing control state (second condition). In the second condition, the center of gravity of a vehicle is biased about 70% forward, so movement direction change of the piston 41 can be performed without reduction of braking deceleration when the wheel pressure for the front wheels is maintained or in the pressure-decreasing control state even though the wheel pressure for the rear wheels is in the pressure-increasing control state.

Meanwhile, the controller 90 can determine whether the direction change condition is satisfied by checking the open/close states of the inlet valves 61~64 that connects/disconnects hydraulic brake pressure that is supplied to each wheel cylinder of a vehicle. That is, the controller 90 can determine that the first condition is satisfied when the inlet valves 61~64 are in the close state, and can determine that the second condition is satisfied when the inlet valves 61 and 64 are in the close state and the inlet valves 62 and 63 are in the open state.

When determining that the direction change condition according to the control state of wheel pressure is satisfied, the controller 90 can perform forward/backward movement direction change of the piston 41 by controlling the driving current that is applied to the actuator 30.

In this process, the controller 90 can perform forward/backward movement direction change of the piston 41 by controlling the driving current, which linearly increases/decreases within a range having a value lower than a reference driving current, to be applied to the actuator 30. The reference driving current means a current that is applied to the actuator 30 to generate torque required for forward/backward movement direction change of the piston 41 at the threshold upper limit position or the threshold lower limit position described above.

That is, a large driving current (i.e., the reference driving current) should be applied to the actuator 30 in order that the piston 41 changes the movement direction at the threshold upper limit position or the threshold lower limit position, as described above. However, noise is correspondingly generated by the operation of the piston 41 and the actuator 30 and hydraulic circuit pressure considerably increases, which exerts an adverse influence on the durability of the actuator 30. Accordingly, the controller 90 of the present embodiment can perform forward/backward movement direction change of the piston 41 by controlling the driving current, which linearly increases/decreases within a range having a value lower than a reference driving current, to be applied to the actuator 30. The change rate (i.e., inclination) of the driving current may be variously selected in consideration of the intention of a designer and the specification of the brake system.

FIG. 2 shows the case when forward/backward movement direction change of the piston 41 is performed on the basis of a large driving current (i.e., a reference driving current) that is applied to the actuator 30 at a threshold upper limit position or a threshold lower limit position in a pressure-increasing control state of wheel pressure, in which it can be seen that the hydraulic circuit pressure considerably increases when the movement direction of the piston 41 is changed, which may exert an adverse influence on the durability of the actuator 30.

FIG. 3 shows the case when a direction change condition according to the control state of wheel pressure is satisfied at a upper limit direction change position or a lower limit direction change position and the forward/backward movement direction change of the piston 41 is performed on the basis of a driving current that linearly increases/decreases within a range having a value lower than a reference driving current, in which it can be seen that it is possible to maintain the braking deceleration by reducing a loss of brake force, reduce noise due to direction change of the piston 41, and improve the durability of the actuator 30.

Figure 4:
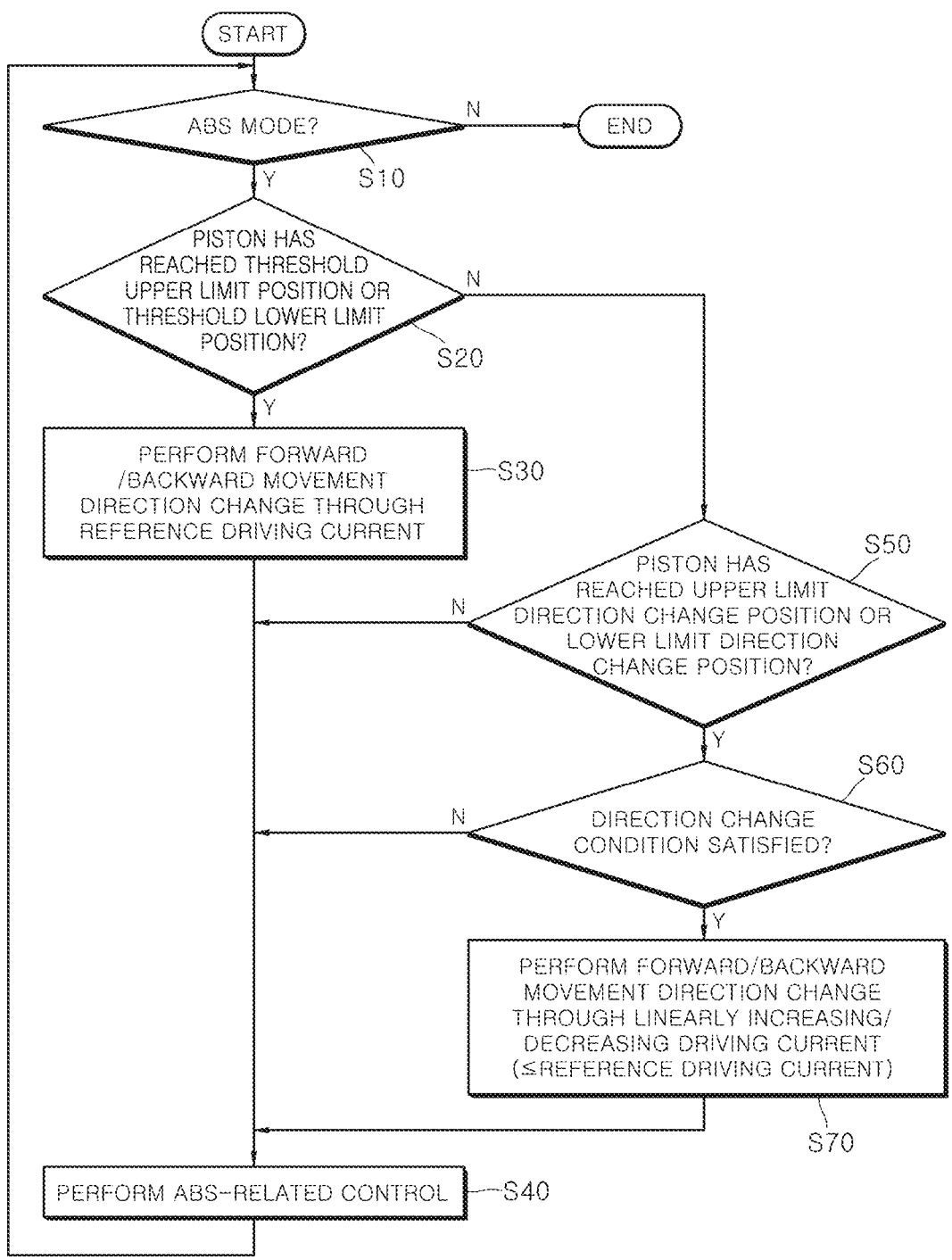
FIG. 4 is a flowchart for illustrating a method of controlling an ABS of an ESC integrated brake system according to an embodiment of the disclosure.

Hereafter, the operation of the apparatus for controlling an ABS of an ESC integrated brake system described above is described mainly in terms of a time series configuration with reference to FIG. 4.

FIG. 4 is a flowchart for illustrating a method of controlling an ABS of an ESC integrated brake system according to an embodiment of the disclosure.

Referring to FIG. 4, a method of controlling an ABS of an ESC integrated brake system according to an embodiment of the disclosure may include: step S10 in which the controller 90 determines whether a brake mode of a vehicle is an Anti-lock Brake System (ABS) mode; step S50 in which when the brake mode of a vehicle is the ABS mode, the controller 90 determines whether the piston 41 of the main master cylinder 40 has reached a predetermined direction change position for forward/backward movement direction change; step S60 in which when the piston 41 has reached the direction change position, the controller 90 determines whether a direction change condition according to the control state of wheel pressure is satisfied; and step S70 in which when the direction change condition is satisfied, the controller 90 performs forward/backward movement direction change of the piston 41 by controlling a driving current that is applied to the actuator 30.

The steps are described in detail. First, the controller 90 determines whether a brake mode of a vehicle is an ABS mode (S10).

When determining that the brake mode of a vehicle is the ABS mode in step S10, the controller 90 determines whether the piston 41 has reached a threshold upper limit position or a threshold lower limit position (S20).

When determining that the piston 41 has not reached the threshold upper limit position or the threshold lower limit position in step S20, the controller 90 determines whether the piston 41 has reached a predetermined direction change position for forward/backward movement direction change (S50). As described above, the direction change position may include an upper limit direction change position set as a position under a threshold upper limit position of the piston 41, and a lower limit direction change position set as a position over a threshold lower limit position of the piston 41.

When determining that the piston 41 has not reached the direction change position in step S50, the controller 90 keeps performing the current ABS-linked control (S40).

When it is determined that the piston 41 has reached to the direction change position in step S50, the controller 90 determines whether a direction change condition according to the control state of wheel pressure is satisfied (S60). As described above, the direction change condition according to the control state of wheel pressure means a condition in which wheel pressure for front wheels and rear wheels is maintained or in a pressure-decreasing control state, or wheel pressure for the front wheels is maintained or in a pressure-decreasing control state and wheel pressure for the rear wheels is in a pressure-increasing control state. Further, in step S60, the controller 90 can determine whether the direction change condition is satisfied by checking the open/close states of the inlet valves 61~64.

When determining that the direction change condition is not satisfied in step S60, the controller 90 keeps performing the current ABS-linked control (S40).

However, when determining that the direction change condition according to the control state of wheel pressure is satisfied in step S60, the controller 90 performs forward/backward movement direction change of the piston 41 by controlling the driving current that is applied to the actuator 30 (S70). In step S70, the controller 90 can perform forward/backward movement direction change of the piston 41 by controlling the driving current, which linearly increases/decreases within a range having a value lower than a reference driving current, to be applied to the actuator 30. Further, as described above, the reference driving current means a current that is applied to the actuator 30 to generate torque required for forward/backward movement direction change of the piston 41 at the threshold upper limit position or the threshold lower limit position.

After step S70, the controller 90 keeps performing the current ABS-linked control (S40).

The process is repeated from step S10 after step S40, and when it is determined at step S20 that the piston 41 has reached the threshold upper limit position or the threshold lower limit position, the controller 90 performs forward/backward movement direction change of the piston 41 by controlling the reference driving current to be applied to the actuator 30 (S30).

The steps S10 to S70 are repeated until the brake mode of a vehicle comes out of the ABS mode.

According to this configuration, it is possible to maximally avoid the case when forward/backward movement direction change of the piston 41 is performed on the basis of a large driving current (i.e., reference driving current) that is applied to the actuator 30 at the threshold upper limit position or the threshold lower limit position in the pressure-increasing control state of wheel pressure. Further, when the direction change condition according to the control state of wheel pressure is satisfied at the upper limit direction change position or the lower limit direction change position, it is possible to maximize the case when forward/backward movement direction change of the piston 41 is performed on the basis of a driving current that linearly increases/decreases within a range having a value lower than the reference driving current. Accordingly, it is possible to maintain the braking deceleration by reducing a loss of brake force, reduce noise due to direction change of the piston 41, and improve the durability of the actuator 30.

Although the disclosure has been described with reference to the exemplary embodiments illustrated in the drawings, those are only examples and may be changed and modified into other equivalent exemplary embodiments from the disclosure by those skilled in the art. Therefore, the technical protection range of the disclosure should be determined by the following claims.

What is claimed is:

1. An apparatus for controlling an Anti-lock Brake System (ABS) of an Electronic Stability Control (ESC) integrated brake system, the apparatus comprising:
   a main master cylinder generating hydraulic brake pressure through a piston that is moved forward/backward by an actuator that is operated when a vehicle is in a braking status; and
   a controller configured to:
   determine whether a direction change condition according to a control state of wheel pressure is satisfied when a brake mode of the vehicle is an ABS mode and the piston has reached a predetermined direction change position for forward/backward movement direction change, and
   perform forward/backward movement direction change of the piston by controlling a driving current that is applied to the actuator upon determining that the direction change condition according to the control state of wheel pressure is satisfied,
   wherein the controller determines whether the direction change condition is satisfied by checking open/close states of inlet valves that connect/disconnect hydraulic brake pressure that is supplied to each wheel cylinder of the vehicle.

2. The apparatus of claim 1, wherein the direction change condition according to the control state of wheel pressure is satisfied when wheel pressure for front wheels and rear wheels is maintained or in a pressure-decreasing control state, or when wheel pressure for the front wheels is maintained or in a pressure-decreasing control state and wheel pressure for the rear wheels is in a pressure-increasing control state.

3. An apparatus for controlling an Anti-lock Brake System (ABS) of an Electronic Stability Control (ESC) integrated brake system, the apparatus comprising:
- a main master cylinder generating hydraulic brake pressure through a piston that is moved forward/backward by an actuator that is operated when a vehicle is in a braking status; and
- a controller controlling forward/backward movement direction change of the piston by controlling a driving current that is applied to the actuator by determining whether a direction change condition according to a control state of wheel pressure is satisfied, when a brake mode of the vehicle is an ABS mode and the piston has reached a predetermined direction change position for forward/backward movement direction change,
- wherein the direction change position comprises an upper limit direction change position set as a position under a threshold upper limit position of the piston, and a lower limit direction change position sets as a position over a threshold lower limit position of the piston.

4. The apparatus of claim 3, wherein the controller performs forward/backward movement direction change of the piston by controlling a driving current, which linearly increases/decreases within a range having a value lower than a reference driving current, to be applied to the actuator,
- wherein the reference driving current is a current that is applied to the actuator to generate torque required for forward/backward movement direction change of the piston at the threshold upper limit position or the threshold lower limit position.

5. A method of controlling an Anti-lock Brake System (ABS) of an Electronic Stability Control (ESC) integrated brake system, the method comprising:
- a step in which a controller determines whether a brake mode of a vehicle is an ABS mode;
- a step in which when the brake mode of a vehicle is the ABS mode, the controller determines whether a piston of a main master cylinder has reached a predetermined direction change position for forward/backward movement direction change, in which the main master cylinder generates hydraulic brake pressure through the piston that is moved forward/backward by an actuator that is operated when a vehicle is in a braking status;
- a step in which when the piston has reached the direction change position, the controller determines whether a direction change condition according to a control state of wheel pressure is satisfied; and
- a step in which when the direction change condition is satisfied, the controller performs forward/backward movement direction change of the piston by controlling a driving current that is applied to the actuator upon determining that the direction change condition according to the control state of wheel pressure is satisfied,
- wherein in the step in which the controller determines whether a direction change condition is satisfied, the controller determines whether the direction change condition is satisfied by checking open/close states of inlet valves that connect/disconnect hydraulic brake pressure that is supplied to each wheel cylinder of the vehicle.

6. The method of claim 5, wherein the direction change condition according to the control state of wheel pressure is satisfied when wheel pressure for front wheels and rear wheels is maintained or in a pressure-decreasing control state, or when wheel pressure for the front wheels is maintained or in a pressure-decreasing control state and wheel pressure for the rear wheels is in a pressure-increasing control state.

7. The method of claim 5, wherein the direction change position comprises an upper limit direction change position set as a position under a threshold upper limit position of the piston, and a lower limit direction change position set as a position over a threshold lower limit position of the piston.

8. The method of claim 7, wherein in the step in which the controller performs forward/backward movement direction change of the piston, the controller performs forward/backward movement direction change of the piston by controlling the driving current, which linearly increases/decreases within a range having a value lower than a reference driving current, to be applied to the actuator,
- wherein the reference driving current is a current that is applied to the actuator to generate torque required for forward/backward movement direction change of the piston at the threshold upper limit position or the threshold lower limit position.

* * * * *